UNITED STATES PATENT OFFICE.

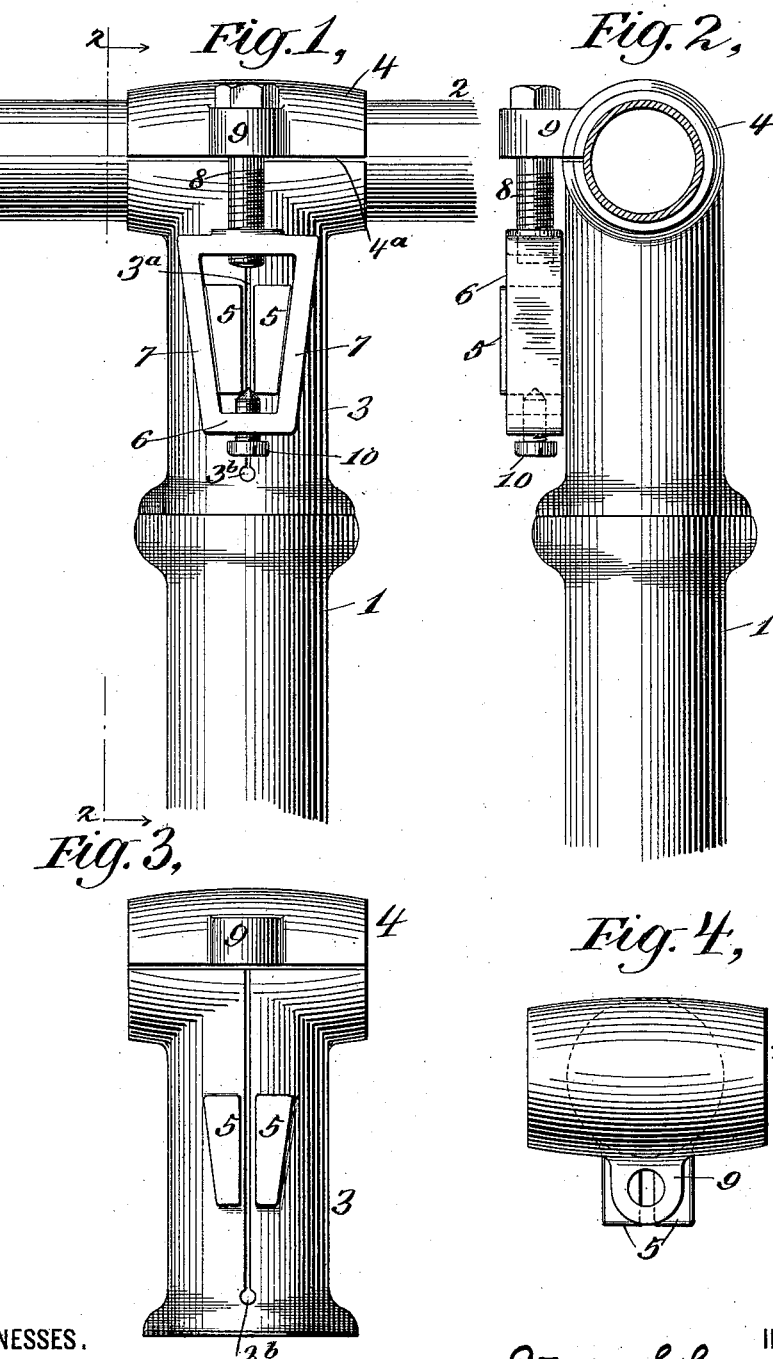

EDWIN S. LEAYCRAFT, OF JERSEY CITY, NEW JERSEY.

BICYCLE.

SPECIFICATION forming part of Letters Patent No. 601,350, dated March 29, 1898.

Application filed June 26, 1897. Serial No. 642,526. (No model.)

*To all whom it may concern:*

Be it known that I, EDWIN S. LEAYCRAFT, of Jersey City, county of Hudson, and State of New Jersey, have invented a certain new and useful Improvement in Bicycles, of which the following is a specification.

The present invention relates to clamps for securing the steering-post and handle of a bicycle or similar vehicle.

In the drawings I have shown a construction embodying my invention, in which—

Figure 1 is an elevation view of portions of a steering-post and bicycle-handle. Fig. 2 is a section along line 2 2 of Fig. 1. Fig. 3 is a detail view in elevation of parts shown in Fig. 1, and Fig. 4 is a plan view of parts shown in Fig. 3.

Like numerals of reference refer to like parts throughout the several views of the drawings.

Referring to the drawings in detail, 1 represents the steering-post of a bicycle, and 2 designates the handle-bar. A clamping part is provided, having a vertical portion 3, having a longitudinal slot $3^a$, terminating in an eye $3^b$, said part being adapted to clamp the steering-post, and a horizontal portion 4, having a longitudinal slot $4^a$, said part being adapted to clamp the handle-bar. The portion 3 is provided with two projecting lugs 5, one side of each of which is oblique, corresponding to the inclined inner surfaces of a keystone-shaped part 6, having converging sides 7, adapted to engage the inclined surfaces of the lugs 5. This keystone-shaped part is provided at its upper portion with a threaded opening in which screws a threaded bolt 8, passing through a lug 9, formed on the part 4. On the lower portion of the keystone-shaped part 6 is a limiting-screw 10 for the purpose of limiting the clamping action upon the lugs 5 and causing the threaded bolt 8 to clamp the part 4, so as to secure the handle-bars.

What is claimed as new is—

1. A clamp for the steering-post of a bicycle or similar vehicle, the same consisting of a split ring provided with lugs, each having an inclined surface and a part having an opening having converging sides adapted to engage said lugs to clamp the collar upon the steering-post, substantially as specified.

2. A clamp for bicycles or similar vehicles, the same consisting of a split ring adapted to engage the steering-post, a transverse split ring formed integral therewith, lugs on the split ring adapted to engage the steering-post, each of said lugs having an inclined surface, a lug on the transverse split ring, a part having an aperture provided with converging sides adapted to engage the lugs, and a threaded bolt passing through the lug formed on the transverse split ring and threaded into the clamping part, substantially as specified.

In testimony whereof I have signed my name to this specification in the presence of two subscribing witnesses.

EDWIN S. LEAYCRAFT.

Witnesses:
ERNEST HOPKINSON,
W. LAIRD GOLDSBOROUGH.